United States Patent
Putnam et al.

[19]

[11] Patent Number: 6,122,305
[45] Date of Patent: Sep. 19, 2000

[54] BROADBAND MODE-LOCKED FIBER LASER, PARTICULARLY FOR FIBER BRAGG GRATING INTERROGATION

[75] Inventors: Martin A. Putnam, Fairfax; Michael L. Dennis, Alexandria; Irl N. Duling, III, Round Hill, all of Va.; E. Joseph Friebele, Cheverly, Md.; Jin U. Kang, Centreville, Va.

[73] Assignee: The United States of America as represented by the Secretary of the Navy, Washington, D.C.

[21] Appl. No.: 09/024,516
[22] Filed: Feb. 17, 1998
[51] Int. Cl.[7] .............................. H01S 3/083; G02B 6/34
[52] U.S. Cl. .................................. 372/94; 385/24; 385/37
[58] Field of Search ..................................... 372/6, 92–94, 372/96, 102; 385/10, 15, 24, 37; 356/249, 350

[56] References Cited

U.S. PATENT DOCUMENTS

| | | | |
|---|---|---|---|
| 4,953,939 | 9/1990 | Epworth ................................ | 385/15 X |
| 5,212,711 | 5/1993 | Harvey et al. ............................. | 372/94 |
| 5,450,427 | 9/1995 | Fermann et al. ......................... | 372/6 X |
| 5,488,475 | 1/1996 | Friebele et al. .......................... | 372/6 X |
| 5,627,848 | 5/1997 | Fermann et al. ......................... | 372/6 X |
| 5,724,371 | 3/1998 | Magne et al. .............................. | 372/6 |
| 5,844,927 | 12/1998 | Kringlebotn ................................ | 372/6 |

OTHER PUBLICATIONS

Putnam et al., Sensor Grating Array Demodulation Using a Passively Mode–Locked Fiber Laser, Technical Digests of Presentations at the Optical Society of America Conference Feb. 16–21, 1997, OSA Technical Digest Series, vol. 6, pp. 156–157.

Putnam et al., Sensor Grating Demodulation Using a Passively Mode Locked Fiber Laser, Proceedings of SPIE conference Mar. 3–5, 1997, SPIE vol. 3042, pp. 352–357.

Putnam et al., Broadband Square–Pulse Operation of a Passively Mode–Locked Fiber Laser for Fiber Bragg Grating Interrogation, Optics Letters, vol. 23, p. 138 (No. 2, Jan. 15, 1998).

Dennis et al., Grating Sensor Array Demodulation by Use of a Passively Mode–Locked Fiber Laser, Optics Letters, vol. 22, p. 1362 (No. 17, Sep. 1, 1998).

Jackson et al., Dynamics of the Output of Heavily Tm–Doped Double–Clad Silica Fiber Lasers, J. Optical Society of America, vol. 16, p. 2178 (No. 12 Dec., 1999).

Matsas et al., Self–Starting Passively Mode–Locked Fibre Ring Laser Exploiting Nonlinear Polarization Switching, Optics Communications, vol. 92 p. 61 (1992).

Horowitz et al., Nonlinear Filtering by Use of Intensity–Dependent Polarization Rotation In Birefringent Fibers, Optics Letters, vol. 22, p. 1760 (No. 23, Dec. 1, 1997).

M. Horowitz et al., Noiselike Pulses with a Broadband Spectrum Generated from an Erbium–Doped Fiber Laser, Optics Letters, vol. 22, p. 799 (No. 11, Jun. 1, 1997).

M. Hofer et al., Mode Locking with Cross–Phase and Self–Phase Modulation, Copyright 1991, Optical Society of America, 3 pp.

Haus et al., Additive–Pulse Modelocking in Fiber Lasers, IEEE Journal of Quantum Electronics, vol. 30, p. 200 (No. 1, Jan., 1994).

*Primary Examiner*—John D. Lee
*Attorney, Agent, or Firm*—Barry A. Edelberg

[57] ABSTRACT

In accordance with one aspect of the invention, a ring laser configuration having a polarizer, and whose cavity loop has substantially no net dispersion, permitting mode locked pulsing of high intensity and large bandwidth. In accordance with another aspect of the invention, a system using this laser to interrogate a plurality of arrays of Bragg gratings by use of both time and wavelength division multiplexing, increasing the total number of interrogatable gratings. In accordance with a third aspect of the invention, a system for interrogating one or more fiber Bragg gratings separated from the optical source by a dispersive optical fiber. As such a grating distends responsive to some measurand, its reflection frequency changes, and the traversal time of the reflection over the dispersive fiber changes, permitting inference of the measurand.

8 Claims, 2 Drawing Sheets

BROADBAND MODE-LOCKED FIBER LASER, PARTICULARLY FOR FIBER BRAGG GRATING INTERROGATION

BACKGROUND OF THE INVENTION

Fiber Bragg gratings have been successfully integrated as distributed strain sensors in a number of industrial and military structures, such as bridges, highways, dams, spacecraft, and ship hulls. In addition to their diminutive size and weight and immunity from electromagnetic interference, their potential for large scale multiplexing is an advantage over conventional strain gauges. As sensor fabrication technology moves toward low-cost mass production, there is increased motivation for higher multi-plexibility and bandwidth. Normally, each Fiber Bragg grating reflects light at the specific wavelength for which it was written. However, a change in the environment of the fiber Bragg grating (e.g. strain in the fiber at the location of the grating, or a change in temperature) results in a shift in the reflection wavelength of the grating. As the shift is proportional to the change in the measurand, the grating may be used as a sensor by measuring the magnitude of the wavelength shift. This requires interrogating the grating, i.e. illuminating it with tunable or broadband optical sources and measuring the wavelength either directly or indirectly. Established interrogation approaches, based on tunable filters (fiber Fabry-Perot or acousto-optic based), tunable lasers, or a charge coupled device spectrometer, all rely on wavelength division multiplexing, and a broadband (or broadly tunable) light source. Although these methods are effective, the number of fiber Bragg grating sensors along a single fiber is limited, since unambiguous detection requires allocating a slice of the source's limited spectral bandwidth for each sensor channel. The spectral width of each channel is proportional to the maximum anticipated strain, which for most applications ranges from 0.1 to 1%. For a typical source whose spectral width is less than about 3% of its center wavelength, this relates to a maximum sensor count per fiber which ranges from approximately 2 to 20 respectively. Therefore, wavelength division multiplexing alone is insufficient for interrogating large sensor arrays (e.g. greater than one hundred) in a single fiber.

A significant increase in capacity can be realized by combining wavelength division multiplexing with time division multiplexing in a hybrid system. Time division multiplexing involves illuminating the gratings with a pulsed light source, then electronically or optically gating the returned pulses in time. In the hybrid system, multiple copies of the fiber Bragg grating subarrays, each containing multiple elements which have different Bragg wavelengths, are combined in a single fiber to form one large array. The replica subarrays are interrogated by time division multiplexing, while intra-array interrogation is achieved via wavelength division multiplexing.

Unfortunately, to achieve uniform illumination of multiple subarrays, the fractional optical power consumed by spectrally overlapping gratings of each subarray must be limited to only a few percent rather than 80–90% which is typically used. This is required to prevent "shadowing" of the distant gratings by the proximal. However, this can be a serious limitation, since such a sacrifice in signal (approximately a factor of 20) can rarely be tolerated due to the low spectral brightness of most sources. With appropriate detection methods a few broadband light sources exist with sufficient spectral brightness for realizing time division multiplexing with low reflectivity fiber Bragg gratings. These include a pulsed 810 nm tapered waveguide amplifier used as an amplified spontaneous emission (ASE) source; an externally modulated, diode pumped, erbium fiber ASE source; and a passively mode-locked erbium fiber laser. The high spectral brightness and unusually broad spectrum of the mode-locked fiber laser make it ideal for wavelength division multiplexing.

SUMMARY OF THE INVENTION

Accordingly, an object of the invention is to generate optical pulses of very high spectral brightness and of very broad bandwidth, with high stability and lower cost than prior systems with comparable spectral intensity and bandwidth.

Another object is to permit generation of optical pulses which are of very short duration.

Another object is to use pulses of this kind to permit effective interrogation of arrays of Bragg gratings in hybrid time and wavelength division multiplexed systems.

In accordance with these and other objects made apparent hereinafter, the invention concerns an optical system with a ring laser and a polarization controller disposed in the loop of the laser, and in which the loop has substantially zero net dispersion at the generating wavelength determined by the center frequency of the gain medium along the optical path around the loop from the output of the polarizer to the input of the polarizer. Because of the zero dispersion, light of a given intensity exiting the polarization controller arrives back at the polarizer with the same polarization state. However, non-linear birefrengence within the loop causes high intensity and low intensity light to evolve different polarization states. By appropriate setting of the birefringent axes of the polarization controller, one can favor transmission of high intensity light, permitting quick buildup of energy, and hence pulsing of very high intensity and broad bandwidth. Prior systems of comparable intensity and bandwidth, mode-locked fiber lasers, and externally modulated erbium ASE sources, require external control to maintain stability, or require an active modulator. Because the invention does not, it is inherently more stable and less costly.

In accordance with another aspect of the invention, a system using this laser interrogates a plurality of arrays of Bragg gratings by use of both time and wavelength division multiplexing, increasing the total number of interrogatable gratings.

In accordance with a third aspect of the invention, a system for interrogating one or more fiber Bragg gratings is separated from the optical source by a dispersive optical fiber. As such a grating distends responsive to some measurand, its reflection frequency changes, and the traversal time of the reflection over the dispersive fiber changes, permitting inference of the measurand.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
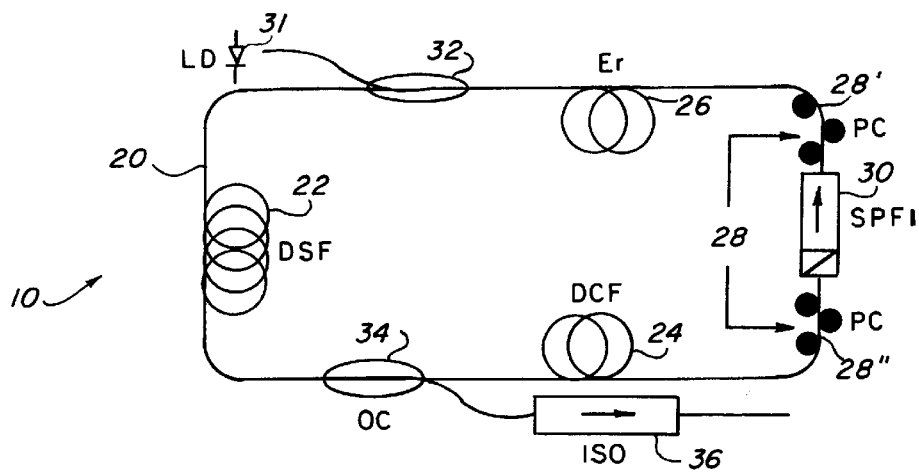
FIG. 1 is a schematic diagram of a laser in accordance with one aspect of the invention.

With reference to the drawing figures, wherein like numbers indicate like parts throughout the several views, FIG. 1 shows a ring laser having optical fiber loop 20, one portion of which is gain medium coil 26, another is dispersion shifted fiber coil 22, and another is dispersion compensated fiber coil 24. The net optical dispersion of coil 24 is designed to compensate for the net dispersion about the loop such that the total dispersion of the ring from the input 28' to the output 28" of polarization controller 28 is to be substantially zero at frequencies generated by gain medium 26, which in th is embodiment is erbium, but could be any such medium known to those in the art. Polarization controller 28 is disposed so that its output is divided unequally onto principle birefringent axes of loop 20. Polarizing isolator 30 serves to force unidirectional lasing and to reject light polarized along one axis, with the result that the signal exiting polarization controller 28 is of a preselected polarization state. Controller 28 preferably has two portions, 28' and 28", disposed on opposite sides of isolator 30, and could be simple birefringent fiber wrapped around a series of mandrels (the three dark circles on either side of member 30 correspond schematically to these mandrels). The axis of the mandrels can be rotated about the length of the fiber and thus mechanically and controllably vary the orientation of the birefringent axes in the wrapped fiber. Laser diode 31 pumps the ring laser with its continuous wave output, being coupled to the laser cavity by coupler 32. Output coupler 34 taps a fraction of the circulating power out of the loop, and constitutes laser output. Isolator 36 prevents feedback into the laser ring cavity, which could disrupt its operation.

In operation, light enters polarization controller at 28' with some arbitrary state of polarization. Polarization controller 28 is adjusted so that its output at 28' unequally divides between the principal birefringence axes of the ring, constituting fibers 26, 22, and 24. The nonlinear refractive index of fibers 22, 24, and 26 will transduce the different intensities of light propagating on the principal axes of loop 20 to a nonlinear birefringence, over and above the linear birefringence of the ring laser loop. This nonlinear birefringence induces an evolution of the polarization state at the output of coil 22 according to the intensity of light launched into coil 22, and splitting ratio thereat. (For example, in the simplest case, this may result in a rigid rotation of the polarization ellipse of light traversing coil 22, with the rotation angle being directly proportional to the input intensity). Thus higher intensity light will always arrive back at polarizer 28" with the same polarization state,and lower intensity light will do likewise, although because of nonlinear birefrengence in the loop the polarization states of the high and low intensity light will be different. By setting polarization controller 28" to rotate the polarization state of the high intensity light onto the passed axis of filter 30, system 10 favors transmission of high intensity light, the rejection of low intensity light, and energy within the laser rapidly builds up to saturation, initiating pulsing.

Manual initiation of mode locking can be achieved by adjusting polarization controllers 28', 28" while simultaneously monitoring the output in the time domain (e.g. by a fast detector) and the wavelength domain (e.g. by an optical spectrum analyzer, "OSA"). Tweaking begins by setting both 28' and 28" such that the center mandrel is rotated through an angle not less than 90° and not more than 150° relative to the two outside mandrels which are set to the same position. The center mandrel of both 28' and 28" are moved through this range of motion (180°). The diagnostics are provided by the detector and the OSA. The first milestone is signs of pulsing which may be orders of magnitude smaller than the final pulse height. From this point the outboard mandrels of 28' and 28" are varied sequentially through their ranges of motion (180°) to emphasize pulsing over continuous operation, and to prefer a single, large, square, broadband pulse per cavity round trip. The process is iterative, with each mandrel being varied in succession, and may need to be repeated twice or more times for optimum operation.

Figure 2:
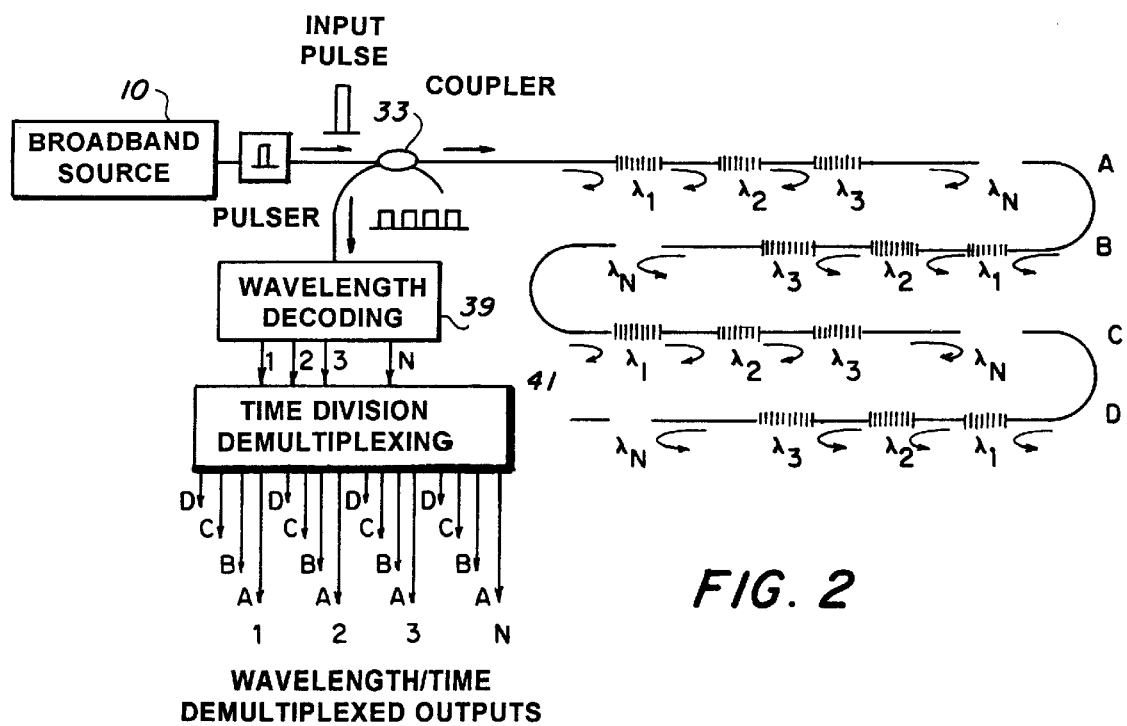
FIG. 2 a schematic diagram of a system for interrogating plural arrays of fiber Bragg gratings, employing a hybrid time and wavelength division multiplexed detector.

FIG. 2 shows a hybrid wavelength division, and time division, multiplexing system for interrogating arrays of Bragg gratings using the intense broadband source of FIG. 1. Broadband source 10 generates a string of optical pulses into fiber coupler 33, and thence into arrays A, B, C, and D of Bragg gratings connected sequentially in series. The gratings are substantially the same from array to array, each array having a total of N gratings, each grating having characteristic wavelengths $\lambda_1, \lambda_2, \ldots, \lambda_N$. The total length of the arrays together provides an optical path length which ensures that the round trip time of a pulse from coupler 33 to the last grating of the last array (grating $\lambda_N$ of array D in FIG. 2) is less than the pulse repetition rate of source 10. This ensures that reflections from all the gratings responsive to one pulse will return and be directed to decoder 39 by coupler 33 before the next pulse enters coupler 33. The series connection of arrays A, B, C, and D inherently divides the time between pulses into four periods, each period corresponding to the time at which reflections from a pulse should return and be detected. Thus pulses should return from array A first, then from array B, etc. Conventional wavelength detector 39 identifies the frequency of each reflected pulse. Conventional time division demultiplexer 41 sorts each of the reflected pulses according to which time period it is returned in, i.e. from which array it reflected from. In this manner, the apparatus of FIG. 2 effects combined time and wavelength division multiplexing, the outputs indicated schematically by ports exiting demultiplexer 41 in a N×4 pattern ("4" being for the four arrays). Being a hybrid system, the high intensity and spectral density of pulses from source 10 each increases the number of Bragg gratings which are unambiguously interrogatable, making the system especially attractive in conjunction with source 10.

Figure 3:
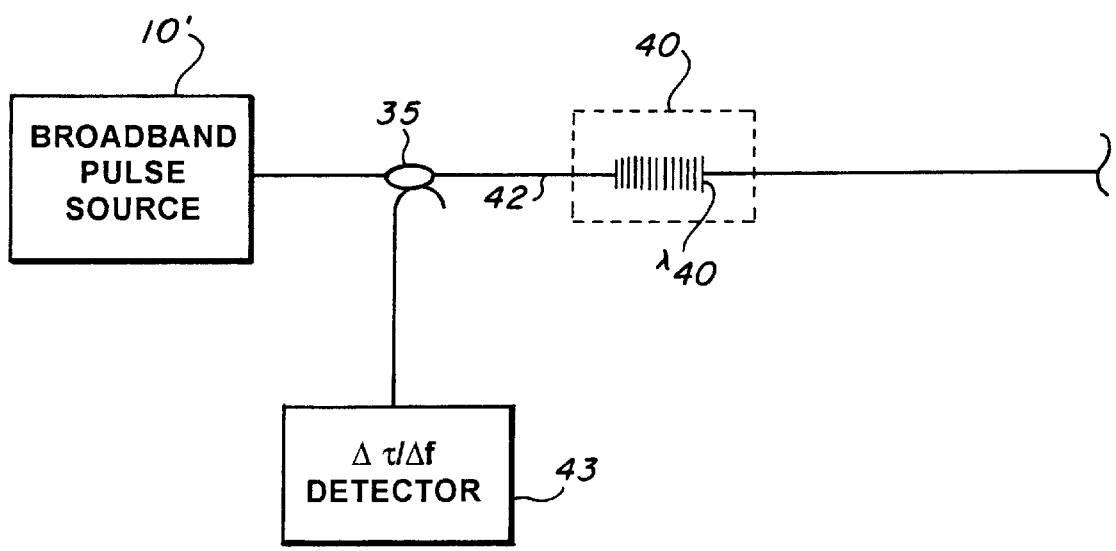
FIG. 3 is a schematic of a Bragg grating detector in accordance with another aspect of the invention.

FIG. 3 shows an alternative system useable with a pulse source such as 10. Source 10' launches a pulse into coupler 35 and ultimately to Bragg grating $\lambda_{40}$, which is fixed to a solid member 40. Source 10 has a high repetition rate, preferably on the order of 1 to 100 MHz, and preferably similar to that of FIG. 1, except without dispersion shifted fiber coil 22, so that it generates one ultra short pulse per cavity round trip, with a broad spectrum (e.g. 20 to 60 nm), in a manner known in the art. Connecting coupler 35 and grating $\lambda_{40}$ is dispersive optical fiber 42. As member 40 distends under, e.g., temperature change or mechanical stress, grating $\lambda_{40}$ distends with it, shifting its characteristic frequency. Because of the dispersiveness of fiber 42, the return time of a pulse reflected from grating $\lambda_{40}$ will vary according to the change in reflected frequency. Coupler 35 directs the reflected pulse to detector 43 which advantageously detects the time of arrival of the reflected pulse, which is a measure of the amount which grating $\lambda_{40}$ has distended due to the conversion of the change in wavelength of $\lambda_{40}$ to a shift in the pulse arrival time by the dispersive fiber 42. The measured time shift is thus a measure of the magnitude of the parameter responsible for the distension The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

What is claimed is:

1. An optical system comprising:

a ring laser; and a polarization controller disposed in the loop of said laser;

wherein said loop has substantially zero net dispersion at the center frequency of the gain medium in said loop along the optical path around said loop from the output of said polarization controller to the input of said polarization controller.

2. The system of claim 1, wherein said polarization controller comprises dispersion compensated optical fiber.

3. An optical system comprising:

a ring laser; and a polarization controller disposed in the loop of said laser;

wherein said loop has substantially zero net dispersion at the center frequency of the gain medium in said loop along the optical path around said loop from the output of said polarization controller to the input of said polarization controller;

said system further comprising:

a plurality of fiber Bragg grating arrays disposed to receive output from said laser, each said array comprising a plurality of Bragg gratings; and a detector disposed to receive reflections from said Bragg gratings in said arrays, said detector comprising a hybrid time and wavelength division multiplexer disposed to process said reflections from said Bragg gratings in said arrays.

4. The system of claim 2, wherein:

each of said arrays are disposed in series with one another along the fiber;

said each said array contains N Bragg gratings numbered 1 to N, N a positive non-zero integer, said Bragg gratings in said each of said arrays having corresponding center frequencies $\lambda_1, \lambda_2, \ldots, \lambda_N$, the nth Bragg grating in said each array having substantially the same center frequency as the nth Bragg grating in the other of said each said array;

wherein said arrays are disposed in series with one another effective to cause light from output form said laser to sequentially encounter said each of said arrays, and, within said each of said arrays, sequentially encounter Bragg grating in order of gratings 1, 2, ..., N.

5. The system of claim 3, wherein said polarization controller comprises dispersion compensated optical fiber.

6. An optical system, comprising:

an optical source;

a fiber Bragg grating;

a dispersive optical fiber disposed to constitute at least a portion of an optical path between said source and said grating; and a detector disposed to receive reflection from said grating of signal from said optical source after said reflection has traversed said dispersive fiber;

wherein said detector is effective to determine time of arrival of said reflection at said detector.

7. The system of claim 6, wherein said detector is adapted to infer from the dispersion in said optical fiber and said time of arrival of said reflection at said detector the center frequency of said Bragg grating.

8. The system of claim 6, wherein said detector is adapted to infer from the dispersion in said optical fiber and said time of arrival of said reflection at said detector change in the center frequency of said Bragg grating over time.

* * * * *